ated Sept. 3, 1918.
UNITED STATES PATENT OFFICE.

PAUL POETSCHKE, OF MILFORD, DELAWARE.

X-RAY-PROTECTIVE CEMENT.

1,278,010. Specification of Letters Patent. Patented Sept. 3, 1918.

No Drawing. Application filed October 8, 1917. Serial No. 195,414.

*To all whom it may concern:*

Be it known that I, PAUL POETSCHKE, a citizen of the United States, residing at Milford, in the county of Sussex and State of Delaware, have invented certain new and useful Improvements in X-Ray-Protective Cement; and I do hereby declare the following to be a full, clear, and exact description of the invention, such as will enable others skilled in the art to which it appertains to make and use the same.

This invention relates to a cement having the property of opacity to X-rays and has for an object to provide such a cement as may be used in various positions as for filling crevices, constructing walls, ceilings, floors, screens and making coated and molded articles generally which, when so used, will absorb or obstruct the passage of X-rays.

The material employed for producing the required opacity is a salt of lead and the cement may assume various properties to correspond to its mechanical requirement.

For instance, using lead carbonate as the desired salt, the entire cement may be made up by using such lead carbonate $66\tfrac{2}{3}$ per cent. and magnesium oxid $33\tfrac{1}{3}$ per cent. This may be mixed with a magnesium chlorid solution of 30 degrees Baumé and the proportion would be approximately 1650 cubic centimeters of the liquid to five kilos of the powder. The powder would be first intimately mixed and then reduced to plastic condition by the addition of the liquid thereto and the cement so produced would be employed for the several purposes above mentioned.

Other lead salts may be substituted for the lead carbonate as for instance, lead sulfid, lead sulfate separately or the several lead salts may be mixed and used in such mixed condition. Metallic lead has heretofore been used as an X-ray screen but I have discovered that the salts of lead perform the same function and when made into the form of a cement are more readily and conveniently applied. Instead of using for a cement base magnesium oxid, plaster of Paris may be substituted, in which case, instead of using the magnesium chlorid solution as the liquid, water may be employed. The nature of the cement, whether using magnesium oxid or plaster of Paris will be determined by the position in which it is placed and the manner of using, the cementitious material forming no part or only a negligible part in obstructing the passage of the X-rays.

The percentage of the salts employed to produce the opacity to X-rays may be varied according to the thickness of cement to be employed. In other words, opacity to the passage of X-rays is produced by the interposition of a certain amount of the salt between the source of the X-rays and the object, and if the cement material is very thin, a greater proportion of the salt will be required; whereas, if the cement is thicker, it is obvious that a lesser amount of the salt need be interposed.

For work in certain positions it will be found desirable to add certain pigments to color the cement, but the addition of such pigments for coloring purposes is solely for the purpose of ornamentation or appearance and has no effect upon the passage of the X-rays.

Under certain conditions, also, it will be found desirable to employ certain well known fillers in the cement body, as for instance wood flour, but the addition of such filler is not considered important to the invention but is only a manner of employing the cementitious material.

What I claim is:—

1. An X-ray obstructing cement comprising a salt of lead $\tfrac{2}{3}$ mixed with a cementitious base $\tfrac{1}{3}$, and a liquid vehicle to form a plastic.

2. An X-ray obstructing cement comprising a salt of lead $\tfrac{2}{3}$ mixed with a cementitious body comprising magnesium oxid and a liquid adapted to render the whole plastic.

3. An X-ray obstructing cement comprising lead carbonate $\tfrac{2}{3}$ and magnesium oxid $\tfrac{1}{3}$ rendered cementitious by a liquid.

4. An X-ray obstructing cement comprising a mixture of powders of lead carbonate and magnesium oxid rendered plastic by a solution of magnesium chlorid.

5. An X-ray obstructing cement comprising lead carbonate approximately 66⅔ per cent., magnesium oxid approximately 33⅓ per cent., and magnesium chlorid solution.

6. An X-ray obstructing cement comprising lead carbonate approximately 66⅔ per cent., a cement forming powder substantially 33⅓ per cent., and a liquid to form of the whole a plastic.

In testimony whereof I affix my signature.

PAUL POETSCHKE.